(No Model.)

E. Z. KIDD.
LAWN MOWER.

No. 470,578. Patented Mar. 8, 1892.

WITNESSES:

INVENTOR:
E. Z. Kidd
BY Munn & Co.
ATTORNEYS

UNITED STATES PATENT OFFICE.

EDWARD Z. KIDD, OF DEADWOOD, SOUTH DAKOTA.

LAWN-MOWER.

SPECIFICATION forming part of Letters Patent No. 470,578, dated March 8, 1892.

Application filed March 25, 1891. Serial No. 386,336. (No model.)

*To all whom it may concern:*

Be it known that I, EDWARD Z. KIDD, of Deadwood, in the county of Lawrence and State of South Dakota, have invented a new and Improved Lawn-Mower, of which the following is a full, clear, and exact description.

The object of the invention is to provide a new and improved lawn-mower, which is simple and durable in construction, very effective in operation, and adapted to easily cut long or short grass without much exertion on the part of the operator propelling the machine.

The invention consists of certain parts and details and combinations of the same, as will be hereinafter fully described, and then pointed out in the claim.

Reference is to be had to the accompanying drawings, forming a part of this specification, in which similar letters of reference indicate corresponding parts in all the figures.

Figure 1:
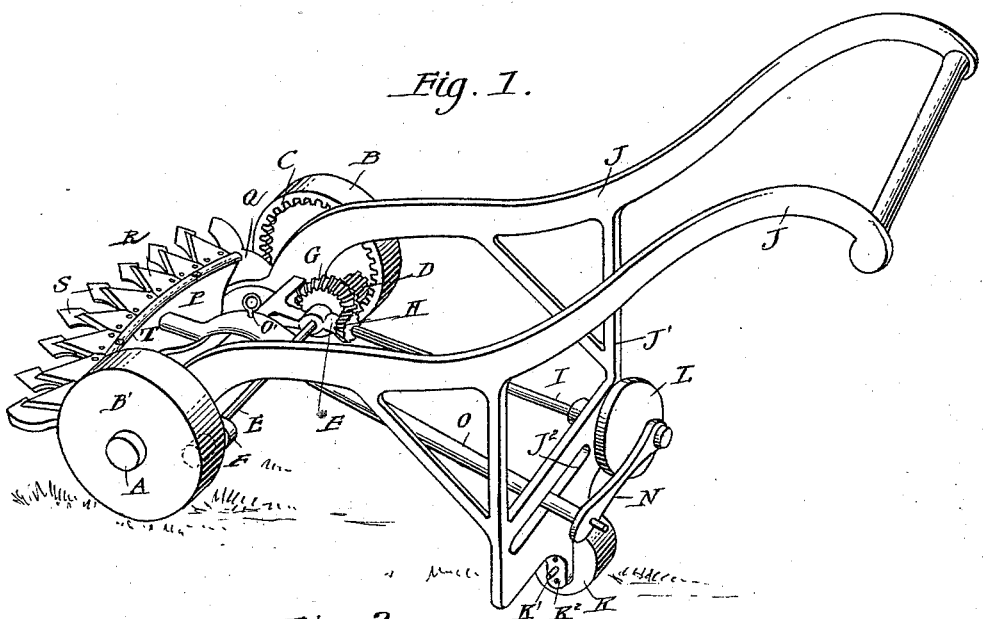
Figure 2:
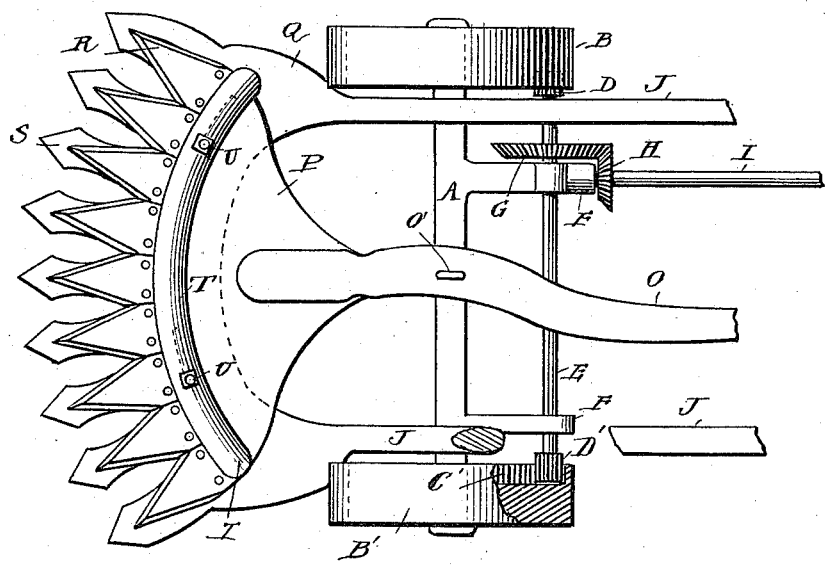
Figure 3:
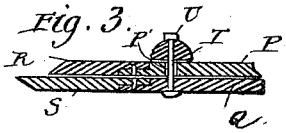

Figure 1 is a perspective view of the improvement. Fig. 2 is a plan view with parts broken out, and Fig. 3 is an enlarged sectional side elevation of the cutting mechanism.

The improved lawn-mower is provided with an axle A, on the ends of which are journaled the main driving-wheels B and B', adapted to travel on the ground and formed on the inside in their rims with internal gear-wheels C and C', respectively meshing into pinions D and D', respectively secured on a shaft E, extending transversely and mounted to turn in suitable bearings F, fastened to and projecting rearward from the axle A. On the shaft E is secured a bevel gear-wheel G in mesh with a bevel-pinion H, secured on a longitudinally-extending shaft I, mounted to turn in suitable bearings, one of which is formed on one of the bearings F and the other in a transversely-extending frame J', fastened to the handles or arms J, secured to the axle A. The lower end of the frame J' is formed with brackets, in which is journaled a wheel K, adapted to travel on the ground, so as to support with the wheels B and B' the entire machine. The shaft K' of the wheel K is adapted to be passed into rows of apertures arranged vertically in the brackets of the frame J', so as to raise or lower the rear part of the arms J for the purpose hereinafter more fully described.

On the rear end of the shaft I is secured a crank-disk L, pivotally connected by a pitman N with the rear end of a lever O, pivoted at O' on the top of the axle A, as is plainly illustrated in Fig. 1. The lever O projects to the front, is slightly curved downward, and is attached to a plate P, fitted to slide transversely over a plate Q, rigidly connected to the front ends of the arms or handles J. The plate P carries the knives R, and similar knives S are secured to the plate Q. The sets of knives R and S are preferably arranged in the arc of a circle, as most clearly shown in Fig. 2. The knives R are V-shaped, of the usual construction, and attached to the plate P by set-screws or other means, as is plainly shown in Fig. 3. The knives S are beveled at their under sides, and are spear-shaped by reason of concavities in their opposite cutting-edges just back of their points, so that two succeeding knives form a narrow entrance opening for the grass, the grass then passing into the wider part between the two knives to be cut by the movable knives R sliding over the fixed set of knives S.

In order to hold the sets of knives R and S one on top of another, a transversely-extending bar T is provided, held on top of the plate P and supported on bolts U, secured to the under plate Q. The bolts U pass through segmental slots P' in the plate P, so that the latter can slide transversely without being hindered by the said bolts. The latter, with the arm T, prevent the two plates P and Q, and consequently the knives R and S, from spreading apart vertically.

The operation is as follows: The operator takes hold of the cross-arm of the handles or arms J and pushes the machine forward over the ground, so that the driving-wheels B and B' are rotated, and by their internal gear-wheels C and C' and the pinions D and D' impart a rotary motion to the shaft E. The latter, by its bevel gear-wheel G, meshing into the pinion H, revolves the shaft I, and the latter by its crank-disk L and the pitman N imparts a transversely-swinging motion to the lever O, the latter being guided in a transverse slot J² of the frame J'. The plate P, carrying the knives R and held on the front end of the lever O, receives by the swinging motion of the said lever O a reciprocating motion over the fixed plate Q, so that the grass entering between the spear-shaped fixed knives S is cut by the moving knives R. By raising or lowering the wheels K the sets of knives R and S are raised or lowered correspondingly, so that the grass is cut long or short, as described. The points or front ends of the movable knives R terminate about at the side points of the spear-shaped and fixed knives S, so that the grass is only cut when it passes into the large opening in two adjacent fixed knives S.

It will be seen that the machine is very simple and durable in construction. The power of the driving-wheels is readily transmitted to the cutting mechanism, so that the grass is cut with great ease, the machine requiring but little power to propel it forward when cutting.

Having thus fully described my invention, I claim as new and desire to secure by Letters Patent—

A lawn-mower consisting of the axle carrying the drive-wheels provided with gears, the handles J J, extending rearward from the axle and having a depending transverse frame J', formed with brackets on its lower edge, the plate Q, having fixed cutters, the lever O, pivoted at O' to the axle and provided with a plate P at its forward end, having a series of cutters at its forward edge, the transverse shaft E, geared at its ends to the drive-wheels, the longitudinal shaft I, geared at its forward end to shaft E, mounted at its rear end in frame J' and having a crank and pitman connection at said rear end with the rear end of lever O, and the roller K, mounted in said brackets, substantially as set forth.

EDWARD Z. KIDD.

Witnesses:
  W. S. ELDER,
  B. WELF.